(No Model.)

M. M. CLARK.
GALVANIC BATTERY.

No. 528,286. Patented Oct. 30, 1894.

Witnesses:
George L. Cragg.
W. Clyde Jones.

Inventor.
Martin M. Clark.
By Barton & Brown
Attorneys

UNITED STATES PATENT OFFICE.

MARTIN M. CLARK, OF CHICAGO, ILLINOIS, ASSIGNOR TO THE WESTERN ELECTRIC COMPANY, OF SAME PLACE.

GALVANIC BATTERY.

SPECIFICATION forming part of Letters Patent No. 528,286, dated October 30, 1894.

Application filed May 27, 1893. Serial No. 475,763. (No model.)

*To all whom it may concern:*

Be it known that I, MARTIN M. CLARK, a citizen of the United States, residing at Chicago, in the county of Cook and State of Illinois, have invented a certain new and useful Improvement in Galvanic Batteries, (Case 10,) of which the following is a full, clear, concise, and exact description, reference being had to the accompanying drawings, forming a part of this specification.

My invention relates to the construction of galvanic batteries and more especially of that class of batteries in which the negative electrode is surrounded with a depolarizing substance in a solid form, as peroxide of manganese. Its object is to provide cheap, simple, and effective means for retaining the depolarizing substance in place around the negative electrode.

One of the forms constructed in accordance with my invention comprises a cylindrical bag or sack of some textile fabric, a circular plate of earthenware closing the lower end of the sack and secured thereto, two semicircular plates of earthenware closing the upper end of the sack and adapted to admit the negative electrode between them, and secured to the sack, and in connection with the negative electrode, means for retaining the electrode in position in the sack. This combination, for convenience, I designate the "negative element." In constructing this form, I prefer to secure the earthenware plates in their places in the sack by means of some waterproof cement, but they may be secured by bands bound round the sack, compressing the latter into grooves formed in the peripheries of the plates. The negative electrode, which may be a carbon plate of the usual form, is retained in position in the sack by a pin projecting upon opposite sides of the plate, and resting against the under side of the earthenware plates which close the upper end of the sack.

My invention will be more readily understood by reference to the accompanying drawings which are illustrative thereof.

Figure 1:
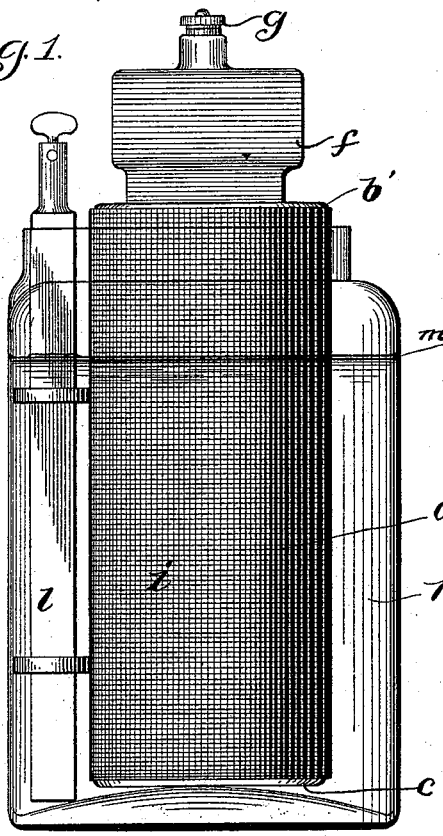
Figure 2:
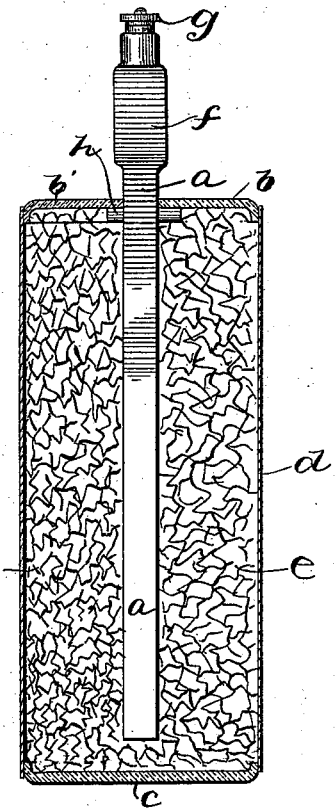
Figure 3:
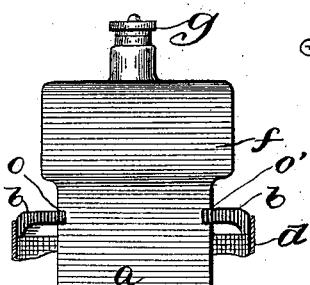
Figure 4:
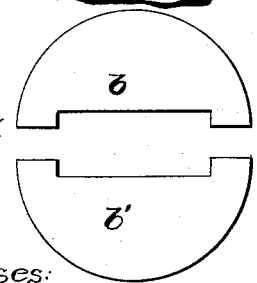
Figure 5:
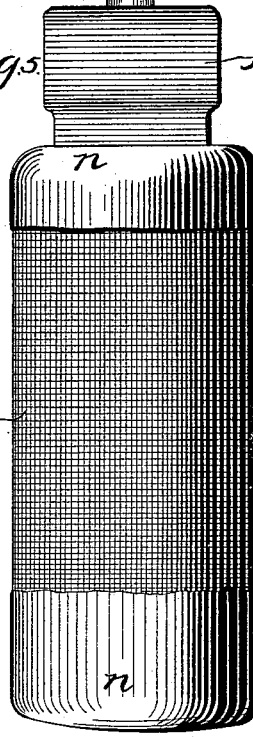
Figure 6:
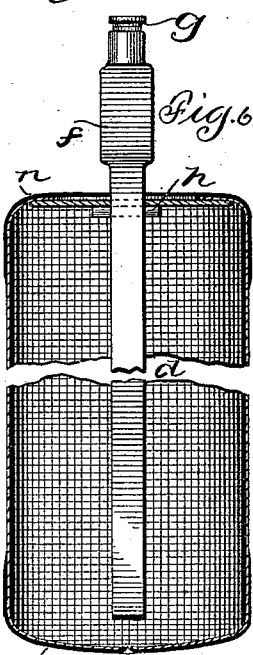

In Figure 1 of the drawings I have shown a complete cell, consisting of my improved form of negative element, a positive element, a fluid electrolyte surrounding both, and a suitable containing vessel. Fig. 2 is a longitudinal sectional view of my improved negative element, with the negative electrode shown in elevation. Fig. 3 shows other means of retaining the carbon plate in position. Fig. 4 is a plan of the plates forming the top of the sack. Fig. 5 is an elevation of a bag or sack similar to that shown in Figs. 1 and 2, showing a modified method of closing its ends. Fig. 6 is a longitudinal sectional view of the sack shown in Fig. 5 with the depolarizing mixture removed and the negative electrode shown in elevation.

Like parts in the several figures are designated by similar letters of reference.

Referring to Fig. 2, $a$ is the carbon plate. $b\ b'$ are two semi-circular plates of earthenware. $c$ is a circular plate of the same material. $d$ is a sack of textile material, preferably canvas. $e$ is the depolarizing mixture, usually peroxide of manganese, mixed with fragments of carbon. The negative electrode $a$ is provided with a suitable head $f$ and a binding screw $g$. Through the plate $a$ just below the earthenware plates $b\ b'$, is thrust a wooden pin $h$, whereby the plate is secured from being removed from the sack.

In Fig. 4 are shown the forms of the plates $b\ b'$ having the recesses to receive the carbon plate $a$.

In Fig. 3 the carbon plate $a$ is embraced by the plates $b\ b'$, which enter into notches $o\ o'$ cut in the edges of the carbon plate $a$, thus retaining it in place.

In Fig. 1 the negative element $i$ is shown in place in a glass jar $k$, containing also a zinc rod $l$ and the electrolyte $m$.

In Figs. 5 and 6 I have shown the sack or bag which contains the depolarizing mixture with a cloth bottom and a cloth rim at the top. Beneath the cloth rim is placed a disk of any suitable substance, preferably pasteboard, through which the negative electrode $a$ is passed. The negative electrode may be secured from being withdrawn in either of the ways shown in Figs. 2 and 3.

A plastic compound $n$ is covered over the bottom and lower portion of the sack as shown, and also about the rim and the upper portion of the sack.

My invention is well adapted to use in dry batteries, in which case the positive electrode, preferably zinc, is preferably made in the form of a cup adapted to contain the negative element and the electrolyte.

I do not confine myself to the use of the material for closing the ends of the sack. I have used wood, carbon, and other substances; but when the negative element is to be used in a dry battery, as described, it is preferable to make the plate c of insulated material.

Having thus described my invention, I claim as new and desire to secure by Letters Patent—

1. The combination, with a negative electrode a, of two plates b b', embracing said electrode, a plate c, a sack d of textile material secured to said plates and surrounding said electrode, and a suitable solid depolarizing substance e contained in said sack, substantially as and for the purpose specified.

2. The combination, with the negative electrode a, of the two semicircular plates b, b', embracing said electrode, a circular plate c below said electrode, a sack of textile material having its ends secured to said plates, and surrounding said electrode, a depolarizing substance d contained in the vessel thus formed, a pin through the electrode a adapted to prevent the electrode from being removed from the sack, substantially as and for the purpose specified.

3. The combination with the negative electrode a having notches o o', of plates b b' and c of insulating material, sack d having its ends secured respectively to said plates, and a solid depolarizer e contained in said sack, substantially as and for the purpose specified.

In witness whereof I hereunto subscribe my name this 16th day of May, A. D. 1893.

MARTIN M. CLARK.

Witnesses:
GEORGE L. CRAGG,
GEORGE McMAHON.